United States Patent
Trim et al.

(10) Patent No.: US 11,169,612 B2
(45) Date of Patent: Nov. 9, 2021

(54) WEARABLE DEVICE CONTROL

(71) Applicant: INTERNATIONAL BUSINESS MACHINES CORPORATION, Armonk, NY (US)

(72) Inventors: Craig M. Trim, Ventura, CA (US); Sarbajit K. Rakshit, Kolkata (IN); Norbert Herman, Denver, CO (US); Shubhadip Ray, Secaucus, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/201,338

(22) Filed: Nov. 27, 2018

(65) Prior Publication Data
US 2020/0167001 A1 May 28, 2020

(51) Int. Cl.
*G06F 3/01* (2006.01)
*G01S 15/62* (2006.01)
*G06F 1/16* (2006.01)

(52) U.S. Cl.
CPC .............. *G06F 3/017* (2013.01); *G01S 15/62* (2013.01); *G06F 1/163* (2013.01); *G06F 3/013* (2013.01)

(58) Field of Classification Search
CPC .......... G06F 3/017; G06F 1/163; G06F 3/013; G01S 15/62
See application file for complete search history.

(56) References Cited

U.S. PATENT DOCUMENTS

| | | | |
|---|---|---|---|
| 2014/0139422 A1* | 5/2014 | Mistry | G06F 1/163 |
| | | | 345/156 |
| 2015/0362999 A1 | 12/2015 | Kim | |
| 2016/0018872 A1* | 1/2016 | Tu | G06F 1/3287 |
| | | | 345/173 |
| 2017/0123487 A1* | 5/2017 | Hazra | G06F 1/163 |
| 2018/0129356 A1 | 5/2018 | Leigh | |
| 2019/0138109 A1* | 5/2019 | Poupyrev | G06F 3/0485 |
| 2019/0196600 A1* | 6/2019 | Rothberg | G06N 20/20 |

FOREIGN PATENT DOCUMENTS

WO 2017036920 W 3/2017

OTHER PUBLICATIONS

Akst, Daniel; A Smartwatch That Works With One Hand; http://www.wsj.com/articles/a-smartwatch-that-works-with-one-hand-1477065016; Oct. 21, 20216; 3 pages.

(Continued)

*Primary Examiner* — Patrick N Edouard
*Assistant Examiner* — Eboni N Giles
(74) *Attorney, Agent, or Firm* — Schmeiser, Olsen & Watts; Michael A. Petrocelli

(57) ABSTRACT

A method and system for improving wearable device function control is provided. The method includes detecting a first gesture executed by a user. A speed and direction of the first gesture; an eye focus of the user, and a time period associated with eye focus being directed towards a display portion of a wearable device are detected. The first gesture is analyzed with respect to previously determined mapping data, the speed and direction of the first gesture, the eye focus of the user, and the time period. In response, a specified function of the wearable device associated with the first gesture is determined and executed.

12 Claims, 8 Drawing Sheets

(56) References Cited

OTHER PUBLICATIONS

Coldewey, Devin; WristWhirl lets you control your smartwatch with hand gestures (and look mad while you do it); TechCrunch; https://techcrunch.com/2016/10/14/wristwhirl-lets-you-control-your-smartwatch-with-hand-gestures-andlook-mad-while-you-do-it/; Oct. 14, 2016; 4 pages.
McIntosh, Jess et al.; EchoFlex: Hand Gesture Recognition using Ultrasound Imaging; Proceedings of the 2017 CHI Conference on Human Factors in Computing Systems; May 6-11, 2017; pp. 1923-1934.
WSJ; The Smartwatch You Can Use With One Hand; Oct. 21, 2016; http://www.wsj.com/video/the-smartwatch-you-can-use-with-one-hand/97117EEA-8DB0-4808-8AFCEFCD4219B70A.html; 1 page.
Mashkif, Nir; Iot, Blockchain and AI; People-Centric IoT; https://www.ibm.com/developerworks/library/ba-bluemix-wearables/index.html; retrieved from the Internet Jul. 16, 2021; 5 pages.
Mell, Peter et al.; "The NIST Definition of Cloud Computing;" National Institute of Standards and Technology; Special Publication 800-145; Sep. 2011; 7 pages.
Oliveira, Guilherme et al.; Working with wearables and Bluemix; http://web.archive.org/web/20151005234153/http://www.ibm.com/developerworks/library/ba-bluemix-wearables/ba-bluemix-wearables-pdf.pdf; May 8, 2015; 14 pages.

\* cited by examiner

WEARABLE DEVICE CONTROL

FIELD

The present invention relates generally to a method for controlling wearable device control functionality and in particular to a method and associated system for improving wearable device technology associated with detecting user gestures and executing specified functions of a wearable device based on the detected gestures.

BACKGROUND

Accurately controlling devices typically includes an inaccurate process with little flexibility. Modifying device functionality associated with user-based controls may include a complicated process that may be time consuming and require a large amount of resources. Accordingly, there exists a need in the art to overcome at least some of the deficiencies and limitations described herein above.

SUMMARY

A first aspect of the invention provides a wearable device function control improvement method comprising: detecting, by a processor of a wearable device via a plurality of ultrasound sensors of the wearable device, a first gesture executed by a user; identifying, by the processor based on data retrieved from the plurality of ultrasound sensors, a speed and direction of the first gesture; identifying, by the processor based on data retrieved from a video retrieval device of the wearable device, an eye focus of the user; identifying, by the processor, a time period associated with the eye focus being directed towards a display portion of the wearable device during the detecting the first gesture; analyzing, by the processor, the first gesture with respect to previously determined mapping data, the speed and direction of the first gesture, the eye focus of the user, and the time period; determining, by the processor based on results of the analyzing, a specified function of the wearable device associated with the first gesture; and automatically executing, by the processor in response to results of the determining, the specified function of the wearable device.

A second aspect of the invention provides a computer program product, comprising a computer readable hardware storage device storing a computer readable program code, the computer readable program code comprising an algorithm that when executed by a processor of wearable device implements a wearable device function control improvement method, the method comprising: detecting, by the processor via a plurality of ultrasound sensors of the wearable device, a first gesture executed by a user; identifying, by the processor based on data retrieved from the plurality of ultrasound sensors, a speed and direction of the first gesture; identifying, by the processor based on data retrieved from a video retrieval device of the wearable device, an eye focus of the user; identifying, by the processor, a time period associated with the eye focus being directed towards a display portion of the wearable device during the detecting the first gesture; analyzing, by the processor, the first gesture with respect to previously determined mapping data, the speed and direction of the first gesture, the eye focus of the user, and the time period; determining, by the processor based on results of the analyzing, a specified function of the wearable device associated with the first gesture; and automatically executing, by the processor in response to results of the determining, the specified function of the wearable device.

A third aspect of the invention provides a wearable device comprising a processor coupled to a computer-readable memory unit, the memory unit comprising instructions that when executed by the processor implements a wearable device function control improvement method comprising: detecting, by the processor via a plurality of ultrasound sensors of the wearable device, a first gesture executed by a user; identifying, by the processor based on data retrieved from the plurality of ultrasound sensors, a speed and direction of the first gesture; identifying, by the processor based on data retrieved from a video retrieval device of the wearable device, an eye focus of the user; identifying, by the processor, a time period associated with the eye focus being directed towards a display portion of the wearable device during the detecting the first gesture; analyzing, by the processor, the first gesture with respect to previously determined mapping data, the speed and direction of the first gesture, the eye focus of the user, and the time period; determining, by the processor based on results of the analyzing, a specified function of the wearable device associated with the first gesture; and automatically executing, by the processor in response to results of the determining, the specified function of the wearable device.

The present invention advantageously provides a simple method and associated system capable of accurately controlling devices.

DETAILED DESCRIPTION

Figure 1:
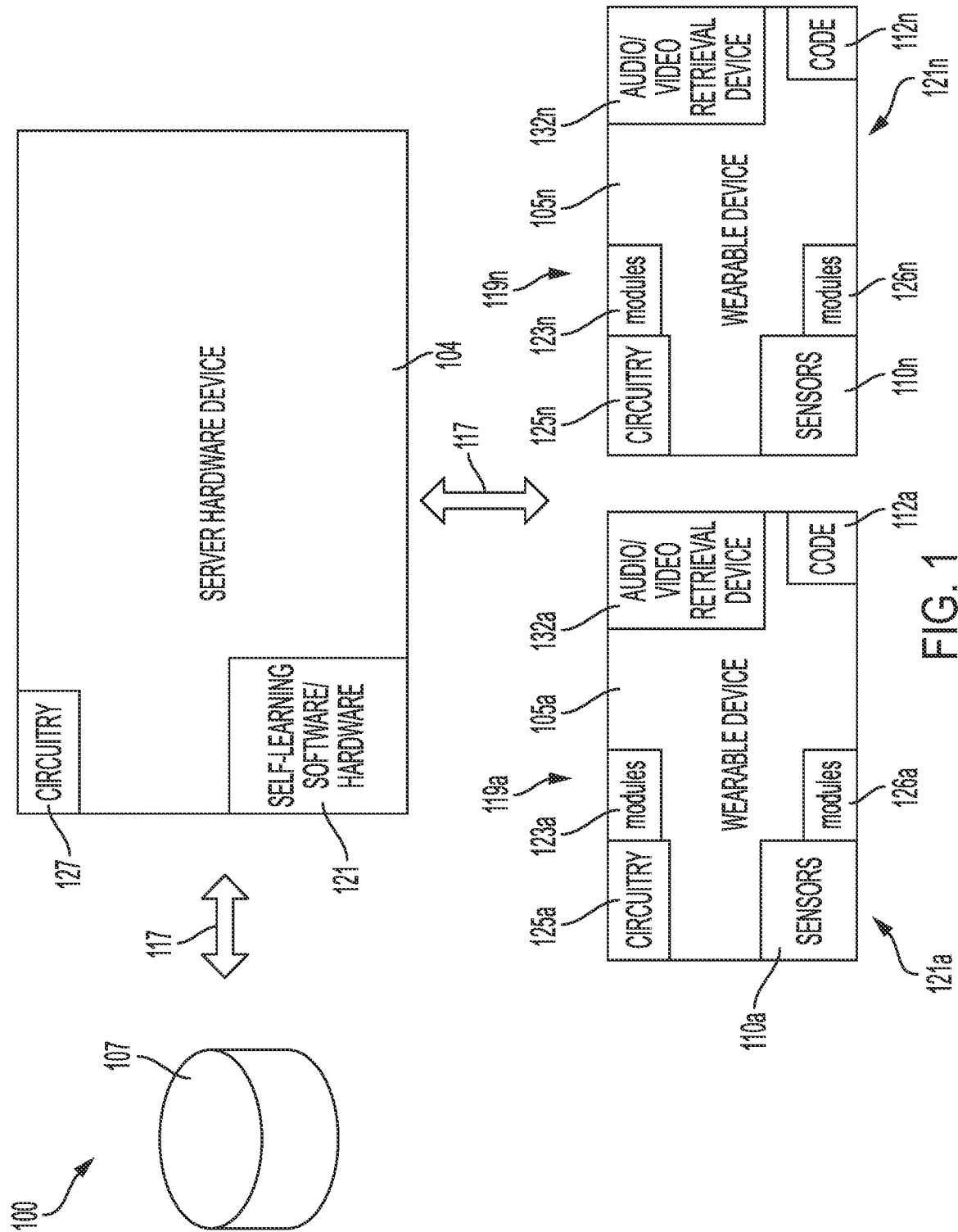
FIG. 1 illustrates a system for improving wearable device technology associated with detecting user gestures and executing specified functions of a wearable device based on the detected gestures, in accordance with embodiments of the present invention.

FIG. 1 illustrates a system 100 for improving wearable device technology associated with detecting user gestures and executing specified functions of a wearable device based on the detected gestures, in accordance with embodiments of the present invention. A typical wearable device (e.g., a smart watch) comprises a small display dimension such that navigation or control of a menu of the wearable device may be difficult due to the small (touch screen) display size. Therefore, system 100 enables a process for controlling functionality of the wearable device without touching a display surface.

System 100 enables a user to access various types of control options associated with very precise levels. For example, an entire three-dimensional movement pattern of fingers (on a user's hand) may be tracked (via a scanning module) with respect to differing finger combination pattern types such that a very small finger movement may be tracked via a scanning process. Additionally, system 100 allows a user to perform multiple simultaneous gestures to control the wearable device with a single hand.

System 100 comprises the following components associated with a wearable device:

1. An ultrasound three-dimensional scanning module for detecting user gestures during a content navigation process. Based on a detected gesture, content of the wearable device is automatically navigated in the smart watch. Additionally, the ultrasound scanning module identifies a speed and direction of a user gesture. The speed and direction of the gesture is converted into a wearable device content navigation pattern.

2. A camera installed within the wearable device for identifying if a user's eye focus is currently viewing a display screen during performance of a gesture. If the user's eye focus is currently viewing a display screen, then a content navigation process is executed. Based on a user's focus direction with respect to a display screen and a display surface orientation, the ultrasound three-dimensional scanning module is activated for scanning a gesture and controlling associated navigation of the wearable device.

System 100 enables a hardware device 104 in combination with wearable devices 105a . . . 105n for modifying control functionality by:

1. Receiving data from hand gestures of a user (ultrasound three-dimensional scanning modules of wearable devices 105a . . . 105n). The wearable device (of wearable devices 105a . . . 105n) may be located on a same hand of a user responsible for the (hand) gestures.
2. Identifying a speed and direction of the user's hand gestures.
3. Identifying a user's eye focus via usage of a camera within a display portion of the wearable device.
4. Identifying when the user's eye focus is directed towards the display portion of the wearable device while detecting the hand gestures.
5. Initiating and identifying navigation of the user's hand gestures based on the user's eye focus being directed towards the display portion of the wearable device.
6. Controlling navigation of the wearable device using the identified navigation of the user's hand gestures.

System 100 of FIG. 1 includes a server hardware device 104 (i.e., specialized hardware device), wearable devices 105a . . . 105n (i.e., specialized hardware device such as, inter alia, a smart watch, smart glasses, etc.), and a database 107 (e.g., a cloud-based system) interconnected through a network 117. Server database system 104 includes specialized circuitry 127 (that may include specialized software) and self-learning software code/hardware structure 121 (i.e., including self-learning software code). Wearable devices 105a . . . 105n may include personal devices provided to each user. Wearable devices 105a . . . 105n may be Bluetooth enabled to provide connectivity to any type of system. Wearable devices 105a . . . 105n include specialized circuitry 125a . . . 125n (that may include specialized software), audio/video retrieval devices 132a . . . 132n, sensors 110a . . . 110n, and code 112a . . . 112n (including configuration code and generated self-learning software code for transfer to server hardware device 104). Sensors 110a . . . 110n may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, etc. Server hardware device 104, wearable devices 105a . . . 105n, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 104, wearable devices 105 . . . 105n, and database 107 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving wearable device technology associated with detecting user gestures and executing specified functions of a wearable device based on the detected gestures. Audio/video retrieval devices 132a . . . 132n may comprise any type of audio/video device including, inter alia, a camera with gaze point tracking hardware and software, a video camera, a still shot camera, etc. Gaze point tracking comprises a process for tracking motion of an eye by measuring either the point of gaze (i.e., a direction that a user is viewing). Gaze point tracking hardware comprises a device for measuring eye positions and eye movement. Network 117 may include any type of network including, inter alia, a local area network, (LAN), a wide area network (WAN), the Internet, a wireless network, etc. Alternatively, network 117 may include an application programming interface (API).

The following details associated with wearable devices 105a . . . 105n describe implementation details and processes for detecting user gestures and executing specified functions of wearable devices 105a . . . 105n.

Wearable devices 105a . . . 105n may comprise a pair of ultrasound detection and camera modules 123a . . . 123n integrated with a top portion 119a . . . 119n of wearable devices 105a . . . 105n and an additional pair of ultrasound detection and camera modules 126a . . . 12nn integrated with wearable device band snaps 121a . . . 121n under a wrist.

Wearable devices 105a . . . 105n may be configured for only activating when a user is viewing and focusing eye movements with respect to a display portion while simultaneously gesturing fingers of a same hand securing one of wearable devices 105a . . . 105n. Wearable devices 105a . . . 105n may be automatically disabled when a display portion is covered by clothing of the user (e.g., sleeves of a winter jacket) since the user may not intend to navigate the wearable device during this condition.

Wearable devices 105a . . . 105n may be configured to activate during specified hand/wrist positions of the user. If fingers of the user are obscured during positioning of the wrist, cameras will continuously record detect a surrounding area. Therefore, when the hand movement executes a lifting motion resulting in an obstruction, the camera is configured to produce the current scene from memory. Likewise, a wide-angle and/or rapid shutter camera may allow wearable devices 105a . . . 105n to continuously record frames that may retrieve a 360-degree view and allow for control functionality in the current area regardless of gesture obstruction.

System enables usage of finger gestures to navigate wearable devices 105a . . . 105n when a user is focusing on one of wearable devices 105a . . . 105n thereby enabling ease of use with respect to issues with touch-based navigation and preserving aesthetics of a display portion. System may additionally detect and learn from finger pattern gestures and provide additional navigation features with respect to wearable devices 105a . . . 105n.

Figure 2:
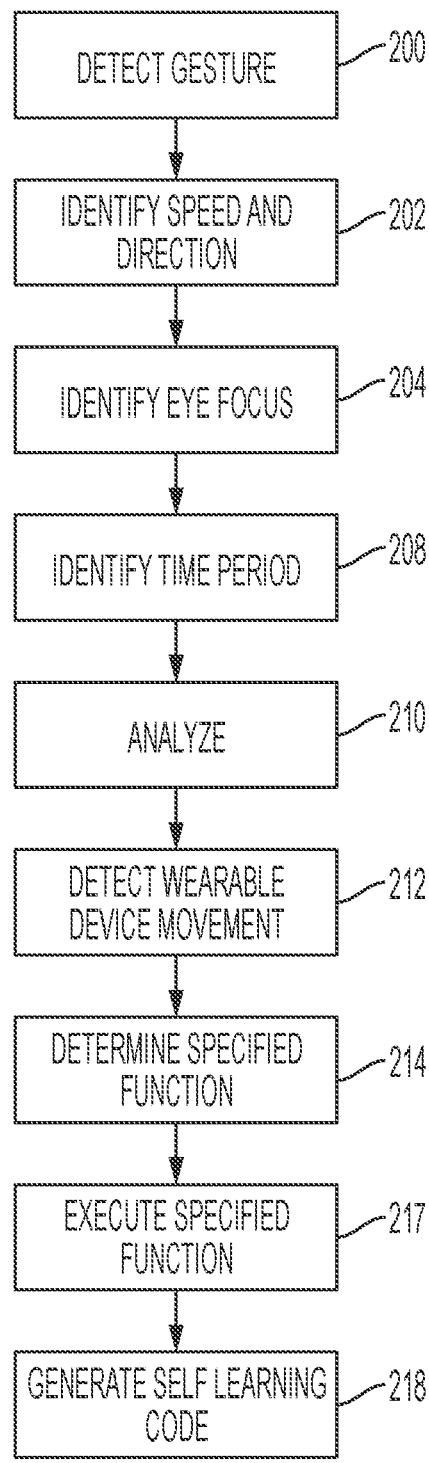
FIG. 2 illustrates an algorithm detailing a process flow enabled by the system of FIG. 1 for improving wearable device technology associated with detecting user gestures and executing specified functions of a wearable device based on the detected gestures, in accordance with embodiments of the present invention.

FIG. 2 illustrates an algorithm detailing a process flow enabled by system 100 of FIG. 1 for improving wearable device technology associated with detecting user gestures and executing specified functions of a wearable device based on the detected gestures, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 104 and wearable devices 105a . . . 105n. In step 200, first a gesture executed by a user is detected via a plurality of ultrasound sensors of a wearable device. The plurality of ultrasound sensors may comprise ultrasound three-dimensional scanning modules. The first gesture may include a hand movement gesture of the user.

In step 202, a speed and direction of the first gesture is identified based on data retrieved from the plurality of ultrasound sensors. In step 204, an eye focus of the user is identified based on data retrieved from a video retrieval device of the wearable device. In step 208, a time period associated with the eye focus being directed towards a display portion of the wearable device during detection of the first gesture is identified. In step 210, the first gesture is analyzed with respect to previously determined mapping data, the speed and direction of the first gesture, the eye focus of the user, and the time period. Generating the previously determined mapping data may include: detecting gestures executed by the user; mapping the gestures with a plurality of functions of the wearable device; and generating the previously determined mapping data.

In step 212, a specified movement of the wearable device is detected with respect to a hand and wrist of the user. The specified movement include rotating the wearable device with respect to the hand and wrist of said user. Additionally, the analysis of step 210 may further include analyzing the first gesture with respect to the specified movement.

In step 214, a specified function of the wearable device associated with the first gesture is determined. The specified function of the wearable device may include, inter alia, a directional scrolling function for scrolling through data presented by a display portion of the wearable device, a focus function of the display portion, an audio level adjustment function, a communication function, etc. In step 217, the specified function of the wearable device is automatically executed. In step 218, self-learning software code for executing future function control processes is generated based on results of the analysis of step 210.

Figure 3:
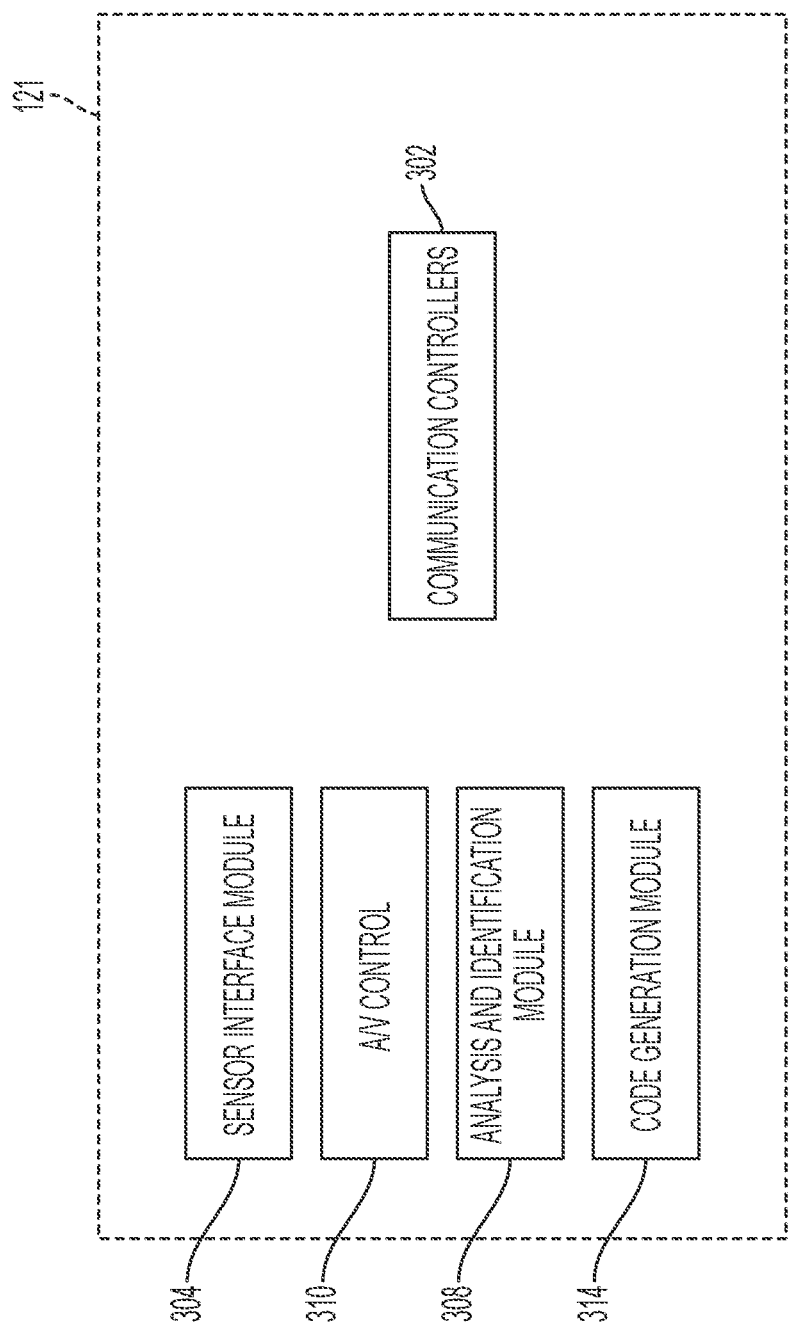
FIG. 3 illustrates an internal structural view of the self-learning software/hardware structure of FIG. 1, in accordance with embodiments of the present invention.

FIG. 3 illustrates an internal structural view of self-learning software/hardware structure 121 of FIG. 1, in accordance with embodiments of the present invention. Self-learning software/hardware structure 121 includes a sensor interface module 304, an audio video control module 310, an analysis and identification module 308, a code generation module 314, and communication controllers 302. Sensor interface module 304 comprises specialized hardware and software for controlling all functions related to sensors 110a . . . 110n of FIG. 1. Audio video control module 310b comprises specialized hardware and software for controlling all functionality related to audio video retrieval devices 132a . . . 132n for retrieving image data and implementing the process described with respect to the algorithm of FIG. 2. Analysis and identification module 308 comprises specialized hardware and software for controlling all functions related to the analysis step of FIG. 2. Code generation module 314 comprises specialized hardware and software for controlling all functions related to generating machine learning feedback for generating self-learning software code for executing future function control processes. Communication controllers 302 are enabled for controlling all communications between sensor interface module 304, audio video control module 310, analysis and identification module 308, and code generation module 314.

Figure 4A:
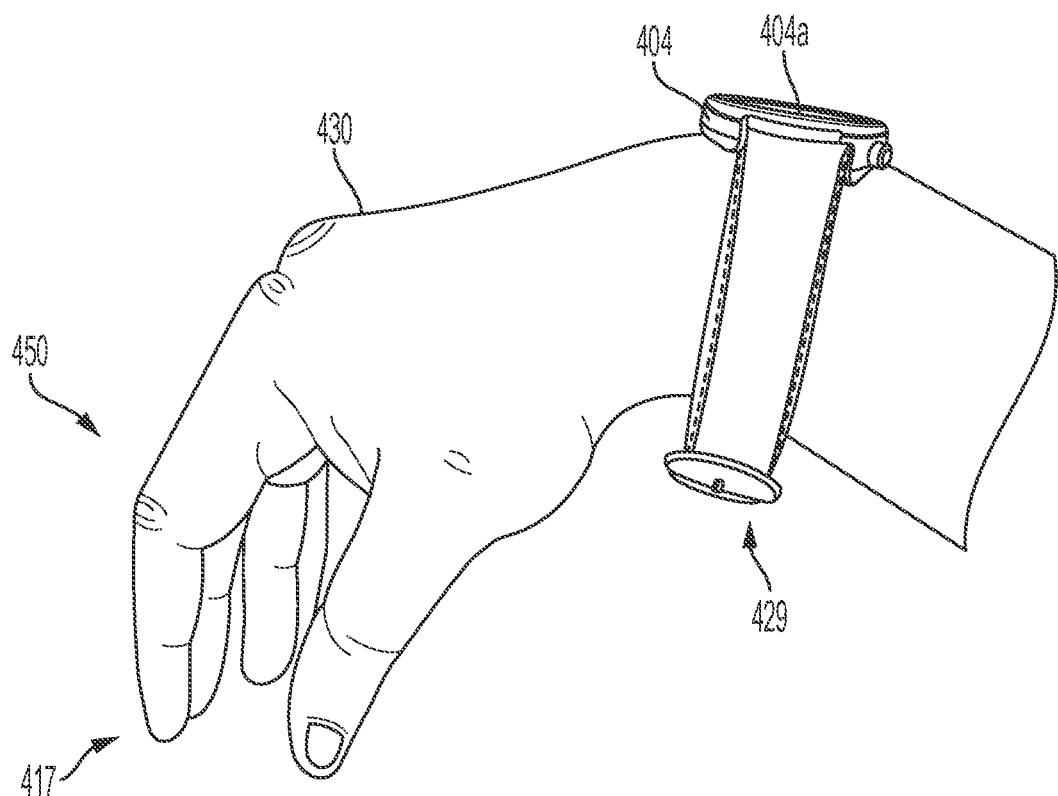
FIGS. 4A and 4B illustrate a user executing a gesture with a same hand, in accordance with embodiments of the present invention.
Figure 4B:
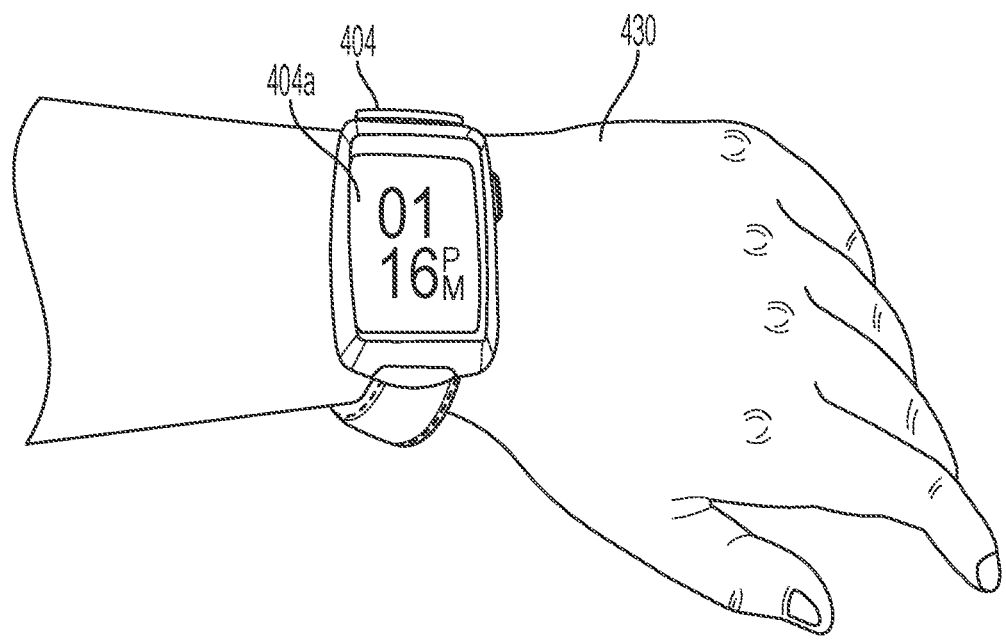

FIGS. 4A and 4B illustrate a user executing a gesture with a same hand, in accordance with embodiments of the present invention.

FIG. 4A illustrates a hand 430 of a user and a wearable device 404 comprising an ultrasound three-dimensional scanning module 429 (within a lower portion of the wearable device 404) for detecting a three-dimensional gesture 417 (e.g., a finger gesture, a rotation, a movement gesture, a zoom gesture, etc.). In response, content navigation is enabled within a display portion 404a of wearable device 404 as illustrated in FIG. 4B. Content navigation may comprise rotating contents or a menu, a zooming map, and scrolling contents presented via display portion 404a of wearable device 404. Ultrasound three-dimensional scanning module 429 is enabled to track finger 450 movement and identify an associated gesture model.

Figure 5A:
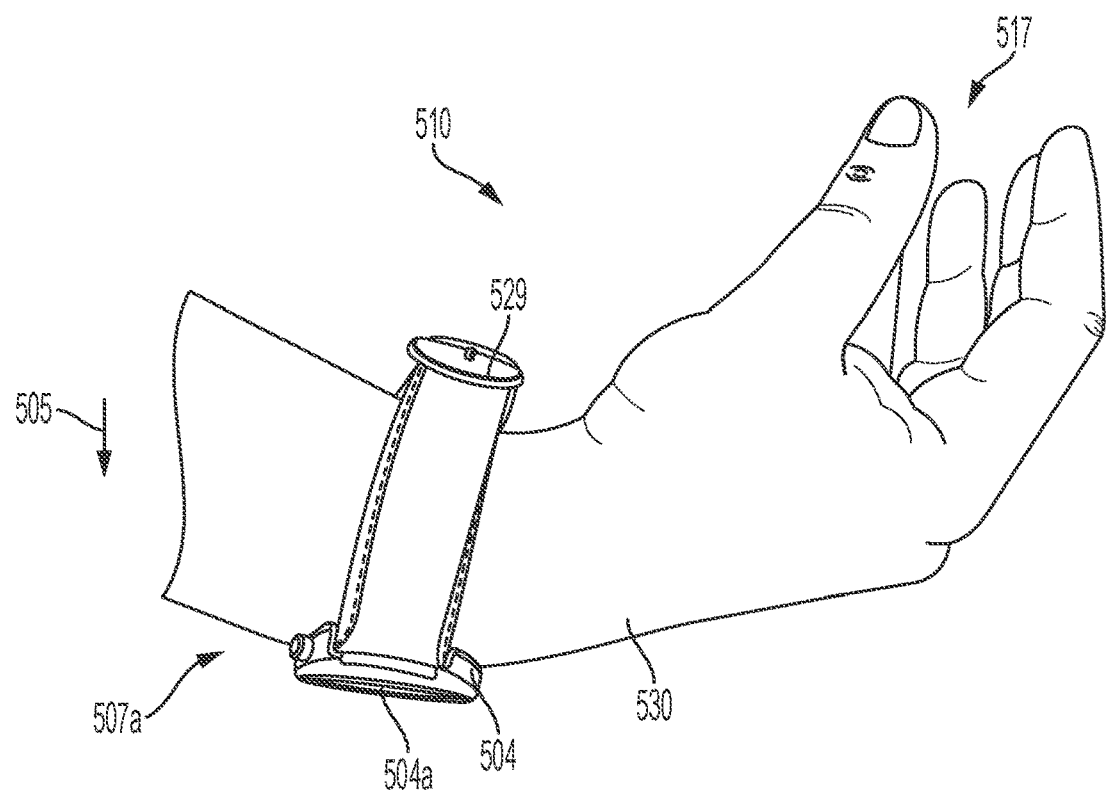
FIGS. 5A and 5B illustrate a process for enabling or disabling content navigation if a user directs a wearable device in differing directions and executes a gesture, in accordance with embodiments of the present invention.
Figure 5B:
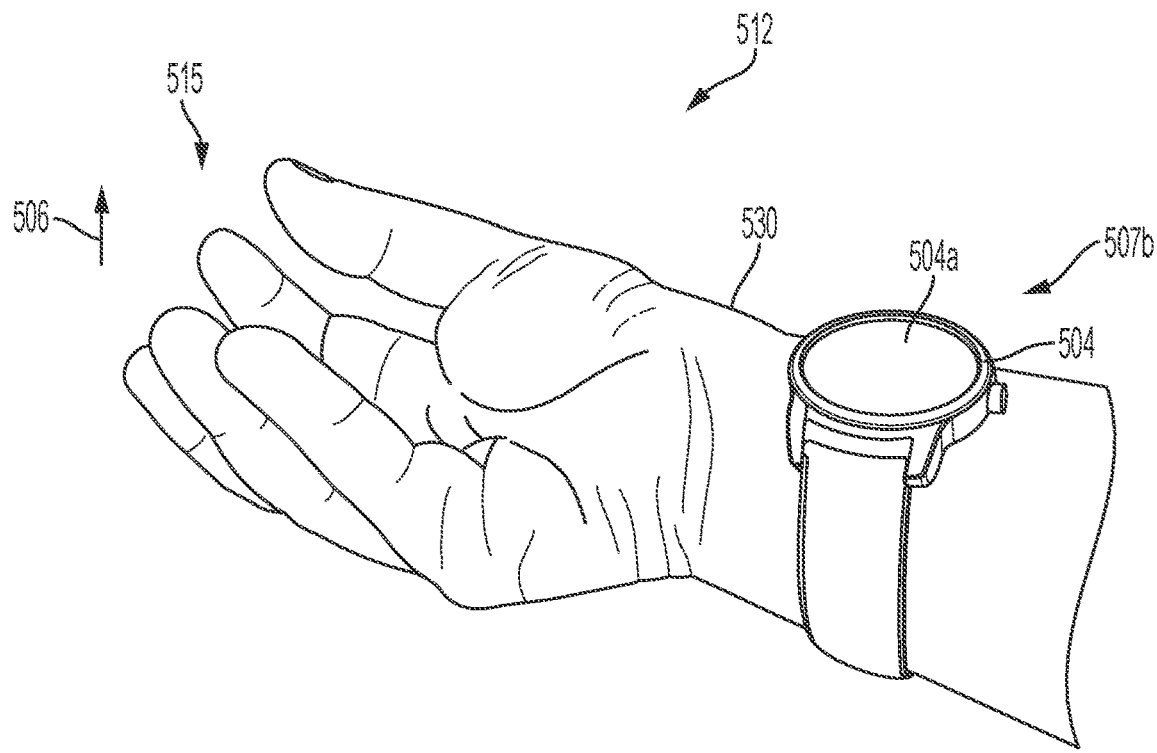

FIGS. 5A and 5B illustrate a process for enabling or disabling content navigation if a user directs a wearable device 504 in a direction 506 or 505 and executes a gesture 515 or 517, in accordance with embodiments of the present invention. Wearable device 504 detects user focus on a display portion 504a. FIG. 5A illustrates a process for disabling content based on wearable device 504 being directed in direction 505 and executing a gesture 517. FIG. 5B illustrates a process for enabling content based on wearable device 504 being directed in direction 506 and executing a gesture 515.

FIGS. 5A and 5B enable the following implementation example:

Wearable device 504 comprises an ultrasound three-dimensional scanning module 529 (within a lower portion of the wearable device 504) for interacting with the user from multiple directions. Ultrasound three-dimensional scanning module 529 is configured to measure a three-dimensional distance and position from a point of measurement. The process is initiated in response to an initial training process for training various types of gesture measurement with respect to ultrasound measurements. Therefore, when a user performs differing gesture types, ultrasound three-dimensional scanning module 529 measures a pattern of gestures and maps the patterns to various wearable device functionalities. Additionally, a camera installed within wearable device 504 in combination with ultrasound three-dimensional scanning module 529 identifies an orientation for display portion 504a and a finger direction with respect to performing a gesture such that when the user wants to navigate displayed content, then user will perform a gesture. Based on a detected muscle movement pattern on a wrist, ultrasound three-dimensional scanning module 529 is activated for scanning the gesture pattern. Based on orientation of display portion 504a with respect to the wrist, the gesture pattern is scanned. Additionally, the user performs a gesture and ultrasound three-dimensional scanning module 529 identifies the gesture pattern. Accordingly display content is controlled.

Figure 6:
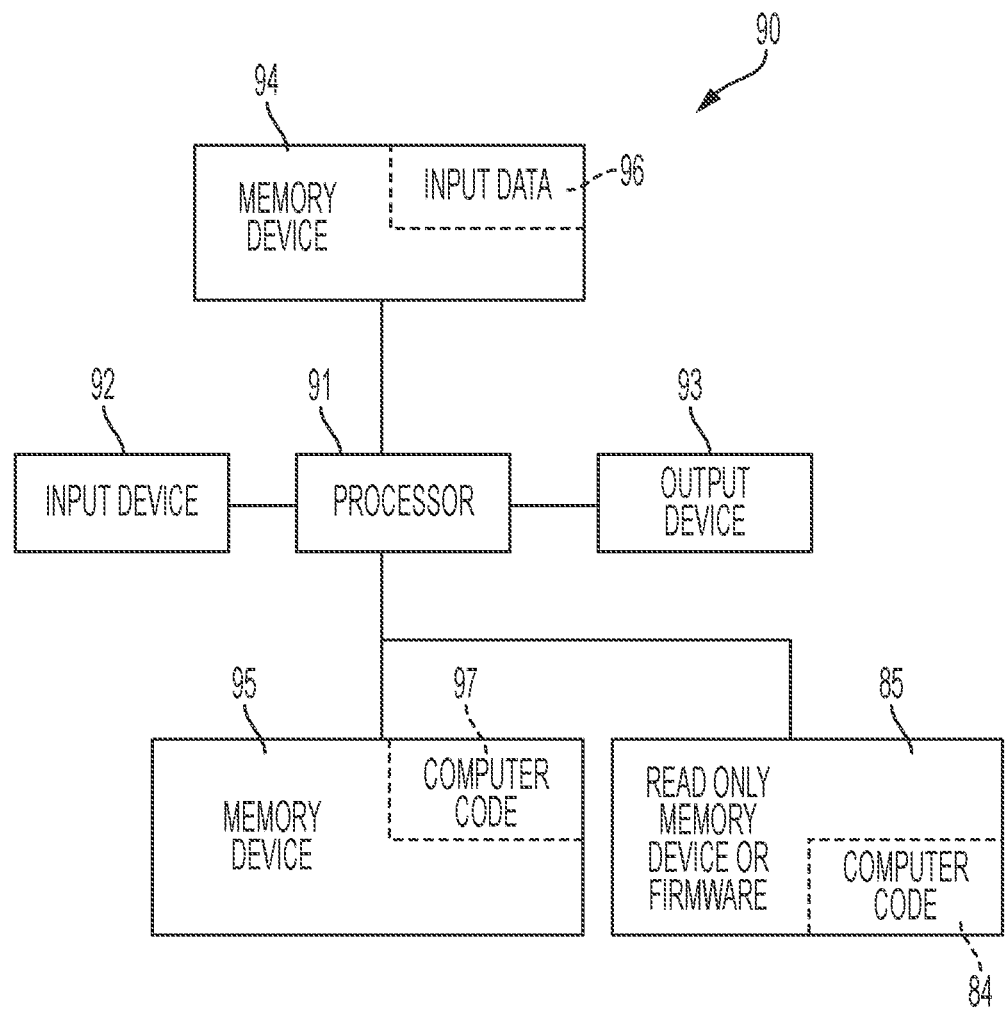
FIG. 6 illustrates a computer system used by the system of FIG. 1 for improving wearable device technology associated with detecting user gestures and executing specified functions of a wearable device based on the detected gestures, in accordance with embodiments of the present invention.

FIG. 6 illustrates a computer system 90 (e.g., wearable devices 105a . . . 105n and/or server hardware device 104 of FIG. 1) used by or comprised by the system of FIG. 1 for improving wearable device technology associated with detecting user gestures and executing specified functions of a wearable device based on the detected gestures, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving wearable device technology associated with detecting user gestures and executing specified functions of a wearable device based on the detected gestures. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve wearable device technology associated with detecting user gestures and executing specified functions of a wearable device based on the detected gestures. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving wearable device technology associated with detecting user gestures and executing specified functions of a wearable device based on the detected gestures. In another embodiment, the invention provides a business method that performs the process steps of the invention on a subscription, advertising, and/or fee basis. That is, a service supplier, such as a Solution Integrator, could offer to enable a process for improving wearable device technology associated with detecting user gestures and executing specified functions of a wearable device based on the detected gestures. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a configuration of hardware and software, any configuration of hardware and software, as would be known to a person of ordinary skill in the art, may be utilized for the purposes stated supra in conjunction with the computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
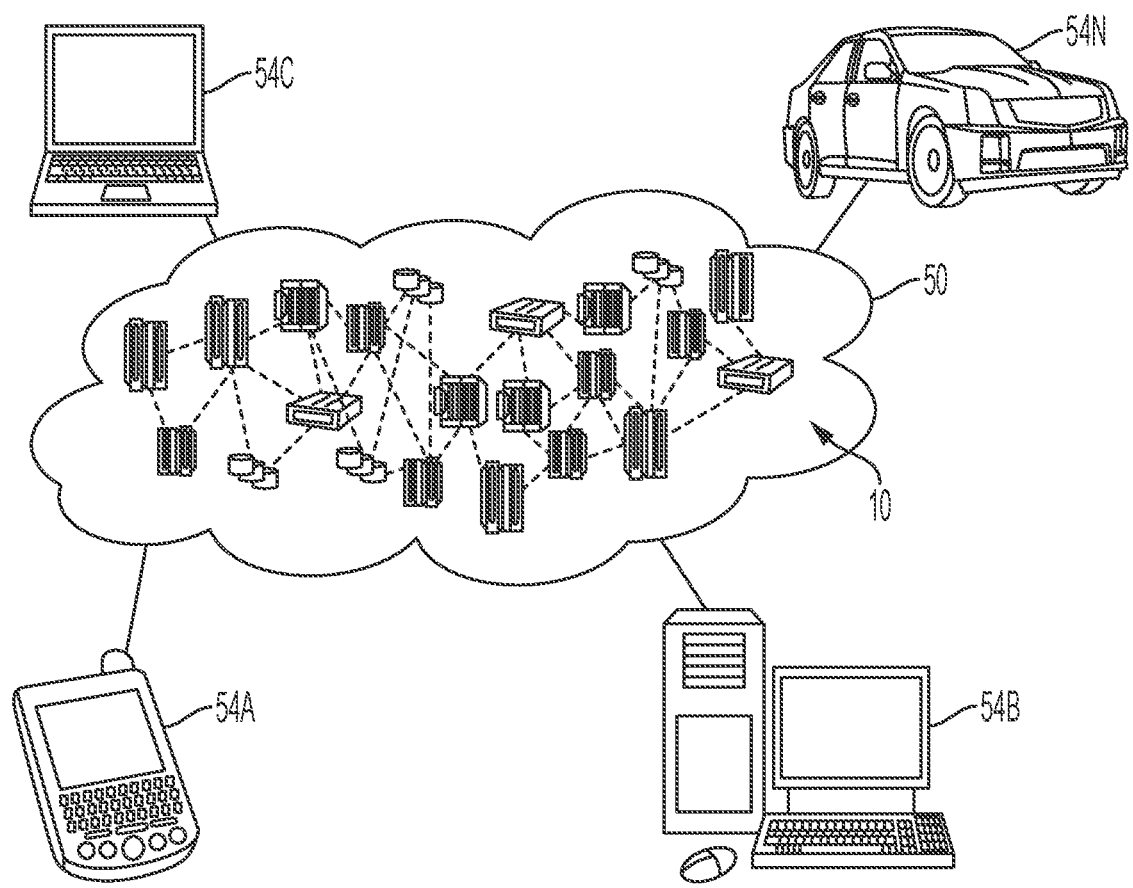
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
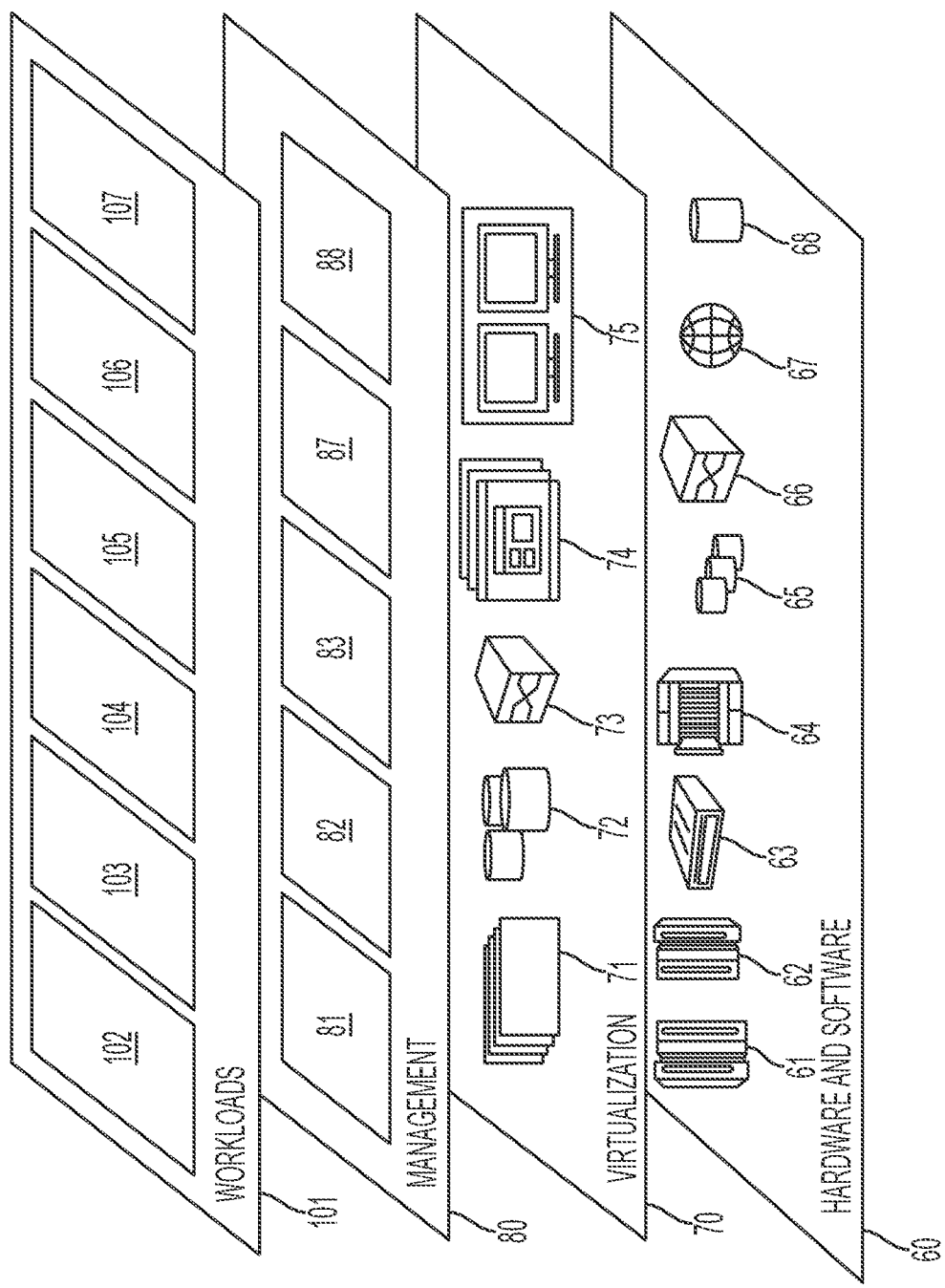
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving wearable device technology associated with detecting user gestures and executing specified functions of a wearable device based on the detected gestures 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A wearable device function control improvement method comprising:

detecting, by a processor of a wearable device via a first ultrasound sensor and a second ultrasound sensor of a plurality of three-dimensional scanning ultrasound sensors of said wearable device, a first gesture executed by a user and a three-dimensional distance and position of said first gesture with respect to a point of measurement, wherein said first ultrasound sensor is integrated with a top portion of said wearable device, wherein said second ultrasound sensor is integrated within a snap portion of a band of said wearable device, wherein said snap portion is positioned opposite from said top portion of said wearable device and under a wrist of said user, wherein said first gesture comprises an entire three-dimensional detected muscle movement pattern of said wrist with respect to hand and finger movement gestures of said user, wherein said entire three-dimensional detected muscle movement pattern is associated with a finger gesture, a rotation gesture, a movement gesture, and a zoom gesture, and wherein said hand and finger movement gestures comprise differing finger combination pattern types such that small finger movements are tracked;

tracking, by said processor via said plurality of three-dimensional scanning ultrasound sensors, said hand and finger movement gestures;

identifying by said processor, a gesture model associated with results of said tracking;

detecting, by said processor via said three-dimensional scanning ultrasound sensors of said wearable device, multiple simultaneous gestures of a single hand of said user;

detecting, by said processor via said plurality of ultrasound sensors, a specified movement of said wearable device, wherein said specified movement comprises rotating said wearable device with respect to said hand and wrist of said user;

identifying, by said processor based on data retrieved from said plurality of ultrasound sensors, a speed and direction of said first gesture;

converting, by said processor, said speed and direction of said first gesture into a content navigation pattern associated with content navigation functionality of said wearable device, wherein said content navigation functionality comprises rotating contents presented via a display portion of said wearable device, zooming contents presented via said display portion, and scrolling contents presented via said display portion;

identifying, by said processor based on data retrieved from a first video retrieval device and a second video retrieval device of said wearable device, an eye focus of said user, wherein said first video retrieval device is integrated with said top portion of said wearable device, and wherein said second video retrieval device is integrated within said snap portion of said band of said wearable device;

identifying, by said processor, a time period associated with said eye focus being directed towards said display portion of said wearable device during said detecting said first gesture;

continuously detecting by said processor via execution of said first video retrieval device and said second video retrieval device, an area surrounding said hand and finger movement gestures;

analyzing, by said processor, said first gesture with respect to previously determined mapping data, said speed and direction of said first gesture, said eye focus of said user, said time period, said specified movement of said wearable device, said gesture model, and recordings generated during said continuously detecting said area surrounding said hand and finger movement gestures;

first detecting, by said processor via said first video retrieval device, said first gesture occurring simultaneously with said eye focus being directed towards said display portion;

second detecting, by said processor via said first video retrieval device, specified fingers of said user being obscured during a hand movement executing a lifting motion positioning of said wrist of said user;

continuously recording, by said processor via said first video retrieval device, said area surrounding said hand and finger movement gestures;

retrieving, by said processor from a memory device in response to results of said second detecting and said continuously recording said area, a pre-recorded visual scene of a current scene of said area surrounding said hand and finger movement gestures;

third detecting, by said processor, said user directing movement of said wearable device in a first direction;

activating, by said processor in response to only said first detecting, said second detecting, said third detecting, said hand and finger movement gestures, and said pre-recorded visual scene, said wearable device for executing said content navigation functionality;

determining, by said processor based on results of said analyzing and in response to said activating, a specified function of said wearable device associated with said first gesture and said multiple simultaneous gestures;

automatically executing via said content navigation functionality without touching said display portion, by said processor in response to results of said determining, said specified function of said wearable device;

detecting, by said processor via said first video retrieval device, said display portion being currently covered by a portion of a sleeve of clothing of said user, wherein said clothing comprises a jacket;

fourth detecting, by said processor, said user directing movement of said wearable device in a second direction opposite to said first direction;

automatically disabling, by said processor in response to an additional gesture, said detecting that said display portion is currently covered, and results of said fourth detecting, said wearable device for executing said content navigation functionality;

detecting and learning, by said processor based on said hand and finger movement gestures, additional content navigation functionality;

generating, by said processor based on results of said detecting and learning, additional navigation features for said wearable device;

continuously recording, by said processor via said first video retrieval device comprising a rapid shutter camera, a 360-degree view with respect to said user for enabling control functionality for said wearable device regardless of any gesture obstruction;

continuously recording, by said processor via an additional video retrieval device, of said wearable device, comprising a wide angle camera, an additional 360-degree view with respect to said user for further enabling further control functionality for said wearable device regardless of any gesture obstruction; and generating, by said processor based on said first gesture and said multiple simultaneous gestures, self-learning software code for executing future additional navigation features.

2. The method of claim 1, wherein generating said previously determined mapping data comprises:

detecting, by said processor via said plurality of ultrasound sensors, a plurality of gestures executed by said user;

mapping, by said processor, said plurality of gestures with a plurality of functions of said wearable device; and generating, by said processor based on results of said mapping, said previously determined mapping data.

3. The method of claim 1, wherein said plurality of ultrasound sensors comprise ultrasound 3-dimensional scanning modules.

4. The method of claim 1, wherein said specified function of said wearable device comprises a function selected from the group consisting of a directional scrolling function for scrolling through data presented by said display portion, a focus function of said display portion, an audio level adjustment function, and a communication function.

5. The method of claim 1, further comprising:

providing at least one support service for at least one of creating, integrating, hosting, maintaining, and deploying computer-readable code in the control hardware, said code being executed by the computer processor to implement: said detecting, said identifying said speed and direction, said identifying said eye focus, said identifying said time period, said analyzing, said determining, and said automatically executing.

6. A computer program product, comprising a computer readable hardware storage device storing a computer readable program code, said computer readable program code comprising an algorithm that when executed by a processor of wearable device implements a wearable device function control improvement method, said method comprising:

detecting, by said processor via a first ultrasound sensor and a second ultrasound sensor of a plurality of three-dimensional scanning ultrasound sensors of said wearable device, a first gesture executed by a user and a three-dimensional distance and position of said first gesture with respect to a point of measurement, wherein said first ultrasound sensor is integrated with a top portion of said wearable device, wherein said second ultrasound sensor is integrated within a snap portion of a band of said wearable device, wherein said snap portion is positioned opposite from said top portion of said wearable device and under a wrist of said user, and wherein said first gesture comprises an entire three-dimensional detected muscle movement pattern of said wrist with respect to hand and finger movement gestures of said user, wherein said entire three-dimensional detected muscle movement pattern is associated with a finger gesture, a rotation gesture, a movement gesture, and a zoom gesture, and wherein said hand and finger movement gestures comprise differing finger combination pattern types such that small finger movements are tracked;

tracking, by said processor via said plurality of three-dimensional scanning ultrasound sensors, said hand and finger movement gestures;

identifying by said processor, a gesture model associated with results of said tracking;

detecting, by said processor via said three-dimensional scanning ultrasound sensors of said wearable device, multiple simultaneous gestures of a single hand of said user;

detecting, by said processor via said plurality of ultrasound sensors, a specified movement of said wearable device, wherein said specified movement comprises rotating said wearable device with respect to said hand and wrist of said user;

identifying, by said processor based on data retrieved from said plurality of ultrasound sensors, a speed and direction of said first gesture;

converting, by said processor, said speed and direction of said first gesture into a content navigation pattern associated with content navigation functionality of said wearable device, wherein said content navigation functionality comprises rotating contents presented via a display portion of said wearable device, zooming contents presented via said display portion, and scrolling contents presented via said display portion;

identifying, by said processor based on data retrieved from a first video retrieval device and a second video retrieval device of said wearable device, an eye focus of said user, wherein said first video retrieval device is integrated with said top portion of said wearable device, and wherein said second video retrieval device is integrated within said snap portion of said band of said wearable device;

identifying, by said processor, a time period associated with said eye focus being directed towards said display portion of said wearable device during said detecting said first gesture;

continuously detecting by said processor via execution of said first video retrieval device and said second video retrieval device, an area surrounding said hand and finger movement gestures;

analyzing, by said processor, said first gesture with respect to previously determined mapping data, said speed and direction of said first gesture, said eye focus of said user, said time period, said specified movement of said wearable device, said gesture model, and recordings generated during said continuously detecting said area surrounding said hand and finger movement gestures;

first detecting, by said processor via said first video retrieval device, said first gesture occurring simultaneously with said eye focus being directed towards said display portion;

second detecting, by said processor via said first video retrieval device, specified fingers of said user being obscured during a hand movement executing a lifting motion positioning of said wrist of said user;

continuously recording, by said processor via said first video retrieval device, said area surrounding said hand and finger movement gestures;

retrieving, by said processor from a memory device in response to results of said second detecting and said continuously recording said area, a pre-recorded visual scene of a current scene of said area surrounding said hand and finger movement gestures;

third detecting, by said processor, said user directing movement of said wearable device in a first direction;

activating, by said processor in response to only said first detecting, said second detecting, said third detecting, said hand and finger movement gestures, and said pre-recorded visual scene, said wearable device for executing said content navigation functionality;

determining, by said processor based on results of said analyzing and in response to said activating, a specified function of said wearable device associated with said first gesture and said multiple simultaneous gestures;

automatically executing via said content navigation functionality without touching said display portion, by said processor in response to results of said determining, said specified function of said wearable device;

detecting, by said processor via said first video retrieval device, said display portion being currently covered by a portion of a sleeve of clothing of said user, wherein said clothing comprises a jacket;

fourth detecting, by said processor, said user directing movement of said wearable device in a second direction opposite to said first direction;

automatically disabling, by said processor in response to an additional gesture, said detecting that said display portion is currently covered, and results of said fourth detecting, said wearable device for executing said content navigation functionality;

detecting and learning, by said processor based on said hand and finger movement gestures, additional content navigation functionality;

generating, by said processor based on results of said detecting and learning, additional navigation features for said wearable device;

continuously recording, by said processor via said first video retrieval device comprising a rapid shutter camera, a 360-degree view with respect to said user for enabling control functionality for said wearable device regardless of any gesture obstruction;

continuously recording, by said processor via an additional video retrieval device, of said wearable device, comprising a wide angle camera, an additional 360-degree view with respect to said user for further enabling further control functionality for said wearable device regardless of any gesture obstruction; and generating, by said processor based on said first gesture and said multiple simultaneous gestures, self-learning software code for executing future additional navigation features.

7. The computer program product of claim 6, wherein generating said previously determined mapping data comprises:

detecting, by said processor via said plurality of ultrasound sensors, a plurality of gestures executed by said user;

mapping, by said processor, said plurality of gestures with a plurality of functions of said wearable device; and generating, by said processor based on results of said mapping, said previously determined mapping data.

8. The computer program product of claim 6, wherein said plurality of ultrasound sensors comprise ultrasound 3-dimensional scanning modules.

9. The computer program product of claim 6, wherein said specified function of said wearable device comprises a function selected from the group consisting of a directional scrolling function for scrolling through data presented by said display portion, a focus function of said display portion, an audio level adjustment function, and a communication function.

10. A wearable device comprising a processor coupled to a computer-readable memory unit, said memory unit comprising instructions that when executed by the processor implements a wearable device function control improvement method comprising:

detecting, by said processor via a first ultrasound sensor and a second ultrasound sensor of a plurality of three-dimensional scanning ultrasound sensors of said wearable device, a first gesture executed by a user and a three-dimensional distance and position of said first gesture with respect to a point of measurement, wherein said first ultrasound sensor is integrated with a top portion of said wearable device, wherein said second ultrasound sensor is integrated within a snap portion of a band of said wearable device, wherein said snap portion is positioned opposite from said top portion of said wearable device and under a wrist of said user, wherein said first gesture comprises an entire three-dimensional detected muscle movement pattern of said wrist with respect to hand and finger movement gestures of said user, wherein said entire three-dimensional detected muscle movement pattern is associated with a finger gesture, a rotation gesture, a movement gesture, and a zoom gesture, and wherein said hand and finger movement gestures comprise differing finger combination pattern types such that small finger movements are tracked;

tracking, by said processor via said plurality of three-dimensional scanning ultrasound sensors, said hand and finger movement gestures;

identifying by said processor, a gesture model associated with results of said tracking;

detecting, by said processor via said three-dimensional scanning ultrasound sensors of said wearable device, multiple simultaneous gestures of a single hand of said user;

detecting, by said processor via said plurality of ultrasound sensors, a specified movement of said wearable device, wherein said specified movement comprises rotating said wearable device with respect to said hand and wrist of said user;

identifying, by said processor based on data retrieved from said plurality of ultrasound sensors, a speed and direction of said first gesture;

converting, by said processor, said speed and direction of said first gesture into a content navigation pattern associated with content navigation functionality of said wearable device, wherein said content navigation functionality comprises rotating contents presented via a display portion of said wearable device, zooming contents presented via said display portion, and scrolling contents presented via said display portion;

identifying, by said processor based on data retrieved from a first video retrieval device and a second video retrieval device of said wearable device, an eye focus of said user, wherein said first video retrieval device is integrated with said top portion of said wearable device, and wherein said second video retrieval device is integrated within said snap portion of said band of said wearable device;

identifying, by said processor, a time period associated with said eye focus being directed towards said display portion of said wearable device during said detecting said first gesture;

continuously detecting by said processor via execution of said first video retrieval device and said second video retrieval device, an area surrounding said hand and finger movement gestures;

analyzing, by said processor, said first gesture with respect to previously determined mapping data, said speed and direction of said first gesture, said eye focus of said user, said time period, said specified movement of said wearable device, said gesture model, and recordings generated during said continuously detecting said area surrounding said hand and finger movement gestures;

first detecting, by said processor via said first video retrieval device, said first gesture occurring simultaneously with said eye focus being directed towards said display portion;

second detecting, by said processor via said first video retrieval device, specified fingers of said user being obscured during a hand movement executing a lifting motion positioning of said wrist of said user;

continuously recording, by said processor via said first video retrieval device, said area surrounding said hand and finger movement gestures;

retrieving, by said processor from a memory device in response to results of said second detecting and said continuously recording said area, a pre-recorded visual scene of a current scene of said area surrounding said hand and finger movement gestures;

third detecting, by said processor, said user directing movement of said wearable device in a first direction;

activating, by said processor in response to only said first detecting, said second detecting, said third detecting, said hand and finger movement gestures, and said pre-recorded visual scene, said wearable device for executing said content navigation functionality;

determining, by said processor based on results of said analyzing and in response to said activating, a specified function of said wearable device associated with said first gesture and said multiple simultaneous gestures;

automatically executing via said content navigation functionality without touching said display portion, by said processor in response to results of said determining, said specified function of said wearable device;

detecting, by said processor via said first video retrieval device, said display portion being currently covered by a portion of a sleeve of clothing of said user, wherein said clothing comprises a jacket;

fourth detecting, by said processor, said user directing movement of said wearable device in a second direction opposite to said first direction;

automatically disabling, by said processor in response to an additional gesture, said detecting that said display portion is currently covered, and results of said fourth detecting, said wearable device for executing said content navigation functionality;

detecting and learning, by said processor based on said hand and finger movement gestures, additional content navigation functionality;

generating, by said processor based on results of said detecting and learning, additional navigation features for said wearable device;

continuously recording, by said processor via said first video retrieval device comprising a rapid shutter camera, a 360-degree view with respect to said user for enabling control functionality for said wearable device regardless of any gesture obstruction;

continuously recording, by said processor via an additional video retrieval device, of said wearable device, comprising a wide angle camera, an additional 360-degree view with respect to said user for further enabling further control functionality for said wearable device regardless of any gesture obstruction; and generating, by said processor based on said first gesture and said multiple simultaneous gestures, self-learning software code for executing future additional navigation features.

11. The wearable device of claim 10, wherein generating said previously determined mapping data comprises:

detecting, by said processor via said plurality of ultrasound sensors, a plurality of gestures executed by said user;

mapping, by said processor, said plurality of gestures with a plurality of functions of said wearable device; and generating, by said processor based on results of said mapping, said previously determined mapping data.

12. The wearable device of claim 10, wherein said plurality of ultrasound sensors comprise ultrasound 3-dimensional scanning modules.

* * * * *